United States Patent
Olsson

(10) Patent No.: US 11,360,182 B2
(45) Date of Patent: Jun. 14, 2022

(54) DETERMINING A LOCATION OF A MOBILE DEVICE

(71) Applicant: ASSA ABLOY AB, Stockholm (SE)

(72) Inventor: Håkan Olsson, Hägersten (SE)

(73) Assignee: ASSA ABLOY AB, Stockholm (SE)

( * ) Notice: Subject to any disclaimer, the term of this patent is extended or adjusted under 35 U.S.C. 154(b) by 0 days.

(21) Appl. No.: 17/046,237

(22) PCT Filed: Apr. 15, 2019

(86) PCT No.: PCT/EP2019/059687
§ 371 (c)(1),
(2) Date: Oct. 8, 2020

(87) PCT Pub. No.: WO2019/201864
PCT Pub. Date: Oct. 24, 2019

(65) Prior Publication Data
US 2021/0033694 A1    Feb. 4, 2021

(30) Foreign Application Priority Data
Apr. 19, 2018 (EP) .................. 18167916

(51) Int. Cl.
*G01S 5/00* (2006.01)
*G01S 5/12* (2006.01)

(52) U.S. Cl.
CPC .............. *G01S 5/0036* (2013.01); *G01S 5/12* (2013.01)

(58) Field of Classification Search
CPC .................. G01S 5/0036; G01S 5/12
See application file for complete search history.

(56) References Cited

U.S. PATENT DOCUMENTS

| 2004/0248589 A1 | 12/2004 | Gwon et al. |
| 2007/0132577 A1 | 6/2007 | Kolavennu |
| 2007/0268138 A1 | 11/2007 | Chung et al. |
| 2010/0150117 A1 | 6/2010 | Aweya et al. |

(Continued)

OTHER PUBLICATIONS

Extended Search Report for European Patent Application No. 18167916.8, dated Nov. 21, 2018, 6 pages.

(Continued)

*Primary Examiner* — Khai M Nguyen
(74) *Attorney, Agent, or Firm* — Sheridan Ross P.C.

(57) ABSTRACT

It is provided a method for determining a location of a mobile device. The method comprises the steps of: obtaining a first maximum distance between a first anchor point and the mobile device; generating a first circular geometrical object having a radius based on the first maximum distance; generating a first polytope encompassing the first circular geometric object, wherein all angles of the first polytope are right angles; obtaining a second maximum distance between a second anchor point and the mobile device; generating a second circular geometrical object having radius based on the second maximum distance; generating a second polytope encompassing the second circular geometric object, wherein all angles of the second polytope are right angles; finding a mobile device region as an overlap between the first polytope and the second polytope; and determining that the mobile device is located within the mobile device region.

14 Claims, 5 Drawing Sheets

(56) References Cited

U.S. PATENT DOCUMENTS

| | | | |
|---|---|---|---|
| 2013/0165142 A1* | 6/2013 | Huang | G06F 16/9537 455/456.1 |
| 2013/0178235 A1* | 7/2013 | Chen | H04W 64/00 455/456.5 |
| 2013/0329581 A1* | 12/2013 | Chen | H04W 64/00 370/252 |
| 2014/0073351 A1 | 3/2014 | Loetter | |
| 2015/0241551 A1 | 8/2015 | Jalali | |
| 2015/0271643 A1 | 9/2015 | Jalali | |

OTHER PUBLICATIONS

International Search Report and Written Opinion for International (PCT) Patent Application No. PCT/EP2019/059687, dated Jul. 2, 2019, 11 pages.

* cited by examiner

DETERMINING A LOCATION OF A MOBILE DEVICE

CROSS REFERENCE TO RELATED APPLICATIONS

This application is a national stage application under 35 U.S.C. 371 and claims the benefit of PCT Application No. PCP/EP2019/059687 having an international filing date of Apr. 15, 2019, which designated the United States, which PCT application claimed the benefit of European Patent Application No. 18167916.8 filed Apr. 19, 2018, the disclosure of each of which are incorporated herein by reference.

TECHNICAL FIELD

The invention relates to a method, a location determiner, a computer program and a computer program product for determining a location of a mobile device.

BACKGROUND

Determining a location of a mobile device, such as a mobile phone or key fob, can be achieved in many different ways. For instance, the location of the mobile device can be determined by measuring the distance from two or more known points and determining the mobile device to be located at a point satisfying the distance measurements. The accuracy is not perfect, whereby there is a margin of error region around the estimated location.

In most situations, it is acceptable that there is a certain margin of error around an estimated location. However, when the location of a mobile device needs to be evaluated with respect to a target region, the presence of a margin of error is not optimal. For instance, the margin of error region is both inside and outside the target region, it is impossible to determine whether the mobile device is inside or outside the target region. Moreover, even if the mobile device most likely is located within the margin of error region, this cannot be guaranteed. In other words, even if a margin of error region is completely inside a target region, there is a very small risk that the mobile device is actually outside the margin of error region and can thus be outside the target region.

US 2007/0268138 A1 discloses object a monitoring, locating and tracking system, and a method employing RDID devices. US 2013/0329581 A1 discloses a method for positioning a mobile device in a wireless wide area network. US 2014/0073351 A1 discloses determining the location of mobile terminals in the presence of a repeater. US 2013/0178235 A1 discloses a wireless communication positioning method.

SUMMARY

It is an object to provide a way to determine a mobile device region in which it can be guaranteed that a mobile device is located.

According to a first aspect, it is provided a method for determining a location of a mobile device. The method is performed in a location determiner and comprises the steps of: obtaining a first maximum distance between a first point first anchor point and the mobile device; generating a first circular geometrical object, centred on the first anchor point, having a radius based on the first maximum distance; generating a first polytope encompassing the first circular geometric object, wherein all angles of the first polytope are right angles; obtaining a second maximum distance between a second anchor point and the mobile device; generating a second circular geometrical object, centred on the second anchor point, having radius based on the second maximum distance; generating a second polytope encompassing the second circular geometric object, wherein all angles of the second polytope are right angles; finding a mobile device region as an overlap between the first polytope and the second polytope, and determining that the mobile device is located within the mobile device region.

At least one side of the first polytope and at least one side of the second polytope may be parallel.

The sides of the first polytope and the second polytope may be aligned with axes of a Cartesian coordinate system.

The method may further comprise the step of: determining that the mobile device is located within a target region when the target region fully encompassed the mobile device region.

Each side of the first polytope may touch the encompassed first circular geometrical object and each side of the second polytope touches the encompassed second circular geometrical object.

The geometrical objects may be two dimensional objects, and the method further comprises the step of: finding intersection points between the first circular geometrical object and the second circular geometrical object; and determining which, if any, of the intersection points that can be applied to restrict where the mobile device is located, and, when applicable, the step of finding the mobile device region comprises reducing the size of the mobile device region based on the at least one applicable intersection point.

The method may further comprise the steps of: obtaining a third maximum distance between a third anchor point and the mobile device; generating a third circular geometrical object, centred on the third anchor point, having a radius based on the third maximum distance; and generating a third polytope encompassing the third circular geometric object, wherein all angles of the third polytope are right angles; wherein the step of finding an overlap comprises finding the overlap between the first polytope, the second polytope and the third polytope.

According to a second aspect, it is provided a location determiner for determining a location of a mobile device. The location determiner comprises: a processor; and a memory storing instructions that, when executed by the processor, cause the location determiner to: obtain a first maximum distance between a first anchor point and the mobile device; generate a first circular geometrical object, centred on the first anchor point, having a radius based on the first maximum distance; generate a first polytope encompassing the first circular geometric object, wherein all angles of the first polytope are right angles; obtain a second maximum distance between a second anchor point and the mobile device; generate a second circular geometrical object, centred on the second anchor point, having radius based on the second maximum distance; generate a second polytope encompassing the second circular geometric object, wherein all angles of the second polytope are right angles; find a mobile device region as an overlap between the first polytope and the second polytope; and determine that the mobile device is located within the mobile device region.

At least one side of the first polytope and at least one side of the second polytope may be parallel.

The sides of the first polytope and the second polytope may be aligned with axes of a Cartesian coordinate system.

The location determiner may further comprise instructions that, when executed by the processor, cause the location determiner to: determine that the mobile device is located within a target region when the target region fully encompassed the mobile device region.

Each side of the first polytope may touch the encompassed first circular geometrical object and each side of the second polytope may touch the encompassed second circular geometrical object.

The geometrical objects may be two dimensional objects, and the method may further comprise instructions that, when executed by the processor, cause the location determiner to: find intersection points between the first circular geometrical object and the second circular geometrical object; and determine which, if any, of the intersection points that can be applied to restrict where the mobile device is located, and, when applicable, reduce the size of the mobile device region based on the at least one applicable intersection point.

According to a third aspect, it is provided a computer program for determining a location of a mobile device. The computer program comprises computer program code which, when run on a location determiner causes the location determiner to: obtain a first maximum distance between a first anchor point and the mobile device; generate a first circular geometrical object, centred on the first anchor point, having a radius based on the first maximum distance; generate a first polytope encompassing the first circular geometric object, wherein all angles of the first polytope are right angles; obtain a second maximum distance between a second anchor point and the mobile device; generate a second circular geometrical object, centred on the second anchor point, having radius based on the second maximum distance; generate a second polytope encompassing the second circular geometric object, wherein all angles of the second polytope are right angles; find a mobile device region as an overlap between the first polytope and the second polytope; and determine that the mobile device is located within the mobile device region.

According to a fourth aspect, it is provided a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Embodiments presented herein exploit the fact that a mobile device cannot be located outside a maximum distance from a measurement point. The measurements define circles (in two dimensions) or spheres (in three dimensions), which, where they overlap contain the mobile device. Additionally, in order to save resource usage, the circles are replaced by polytopes (typically square/cube), for which the overlap can be calculated more efficiently. Significantly, the mobile device can be guaranteed to be located within the overlapping area, which can be exploited e.g. to conclusively determine when a mobile device is within a target area or not.

Figure 1:
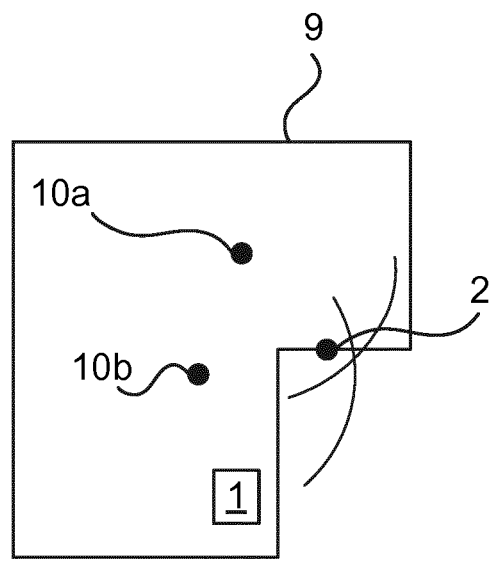
FIG. 1 is a schematic diagram illustrating how small inaccuracies of location determination can have crucial effects for security applications.

FIG. 1 is a schematic diagram illustrating how small inaccuracies of location determination can have crucial effects for security applications.

A target region 9 can e.g. be a building or part of a building, such as a flat or an office. There are here a first anchor point boa and a second anchor point 10b. At the first anchor point, there is a distance measurement device which can measure the distance to a mobile device 2. The distance can e.g. be measured using Time of Flight (ToF). With ToF, the distance to the mobile device is measured by the time it takes for a radio signal to travel to the mobile device 2 and/or back to the distance measurement device.

A location determiner 1 is used to determine the location of the mobile device 2. The location determiner 1 can be a stand-alone device, or it can be housed in another device, such as a device at the first anchor point boa or the second anchor point 10b for measuring distance. When the location determiner is implemented in a battery powered device, it is of utmost importance to conserve resource usage for the location determination.

When the distance measurements are used to determine whether the mobile device 2 is inside or outside the target region 9, small differences can have serious effects.

In the prior art, the location of the mobile device can be determined by measuring the distance from the two points 10a, 10b and determining the mobile device to be located at a point satisfying both distance measurements. The accuracy is not perfect, whereby there is a margin of error region 3 around the estimated location. When the margin of error region 3 is both inside and outside the target region, it is impossible for the location determiner 1 to determine whether the mobile device 2 is inside or outside the target region 9. Moreover, even if the mobile device 2 most likely is located within the margin of error region 3, this cannot be guaranteed.

However, using embodiments presented herein, the location determiner can determine the location of a mobile device region in which it can be guaranteed that the mobile device is located, and this is performed in a resource efficient manner.

Figure 2:
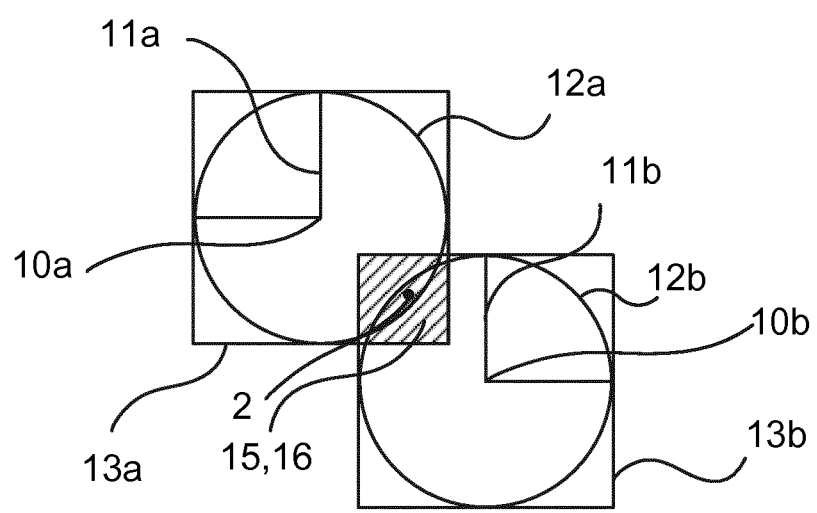
FIG. 2 is a schematic diagram illustrating determination of a mobile device region with great certainty in two dimensions according to one embodiment.

FIG. 2 is a schematic diagram illustrating determination of a mobile device region with great certainty in two dimensions according to one embodiment. There is here a first anchor point boa from which it can be measured a distance to a mobile device. For instance, ToF can be used, the propagation time of a radio signal is used to determine a first maximum distance 11a between the first anchor point boa and the mobile device 2. When e.g. ToF is used, the first maximum distance 11a can be determined on the speed of light. While a delay can be introduced by processing, etc., this would only be reflected in that the mobile device is closer than indicated by the first maximum distance 11a. The only way that the mobile device could be located outside the first maximum distance 11a if signal speeds greater than the speed of light is achieved, which is not possible. A first circular geometrical object 12a is generated based on the first maximum distance 11a, such that the first circular geometrical object 12a is centred on the first anchor point boa and has a radius which is the first maximum distance 11a. Since the scenario of FIG. 2 is in two dimensions, the first circular geometric object 12a is here a circle.

Based on the first maximum distance 11a, it can be safely guaranteed that the mobile device 2 is within the first circular geometrical object 12a.

Analogously, is can be guaranteed that the mobile device 2 is within a second circular geometrical object 12b, which is generated in accordance with how the first circular geometric object 12a is generated.

By combining the first circular geometrical object 12a and the second circular geometrical object 12b, it could be determined that the mobile device 2 is located within a section where the circular geometrical objects 12a, 12b overlap. However, determining this section is computationally expensive, especially if more maximum distances and corresponding circular geometrical objects are applied.

According to embodiments herein, the location of the mobile device is determined in a more computationally efficient manner by additional simplifications. A first polytope 13a is generated which encompasses the first circular geometric object 12a. All angles of the first polytope 13a are right angles. Since the scenario of FIG. 2 is in two dimensions, the first polytope 13a is a, or more specifically a square. More specifically, when the size of the first polytope 13a is minimal in size, but still encompassing the first circular geometric object 12a, the first polytope 13a is a square. The same procedure is repeated for the second circular geometric object 12b, resulting in a second polytope 13b being here a rectangle or a square.

Since the first and second circular geometrical objects 12a-b are respectively encompassed by the first and second polytopes 13a-b, an overlap 16 between the first and second polytopes 13a-b necessarily contains the overlap between the first and second circular geometrical objects 12a-b. In other words, the mobile device 2 must be located within the overlap 16 between the first and second polytopes 13a-b.

The calculation of the rectangular (in two dimensions) overlap 16 between the two polytopes 13a-b is very computationally efficient.

The implication of this is significant, since when the overlap 16 between the first and second polytopes 13a-b is located e.g. within a target space (9 of FIG. 1), it can be deduced that the mobile device 2 must also be located within the target space, which relies on the speed of light for radio signals not being exceeded.

More points and maximum distances can be applied to reduce the size of the overlap 16, and thus the accuracy of the location determination.

In other words, the maximum distances 11a, 11b are used in a computationally effective way to determine a mobile device region 15 in which the mobile device must be located.

Figure 3:
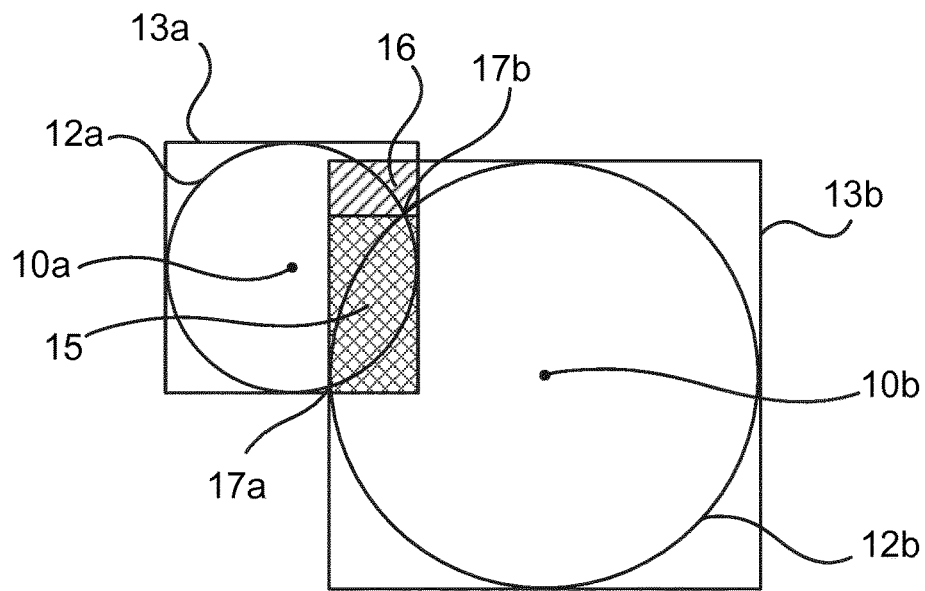
FIG. 3 is a schematic diagram illustrating the determination of a mobile device region with greater accuracy by exploiting intersection points.

FIG. 3 is a schematic diagram illustrating the determination of a mobile device region with greater accuracy by exploiting intersection points.

The scenario of FIG. 3 is similar to that of FIG. 2, but here, a first intersection point 17a and a second intersection point 17b are indicated. The intersection points 17a, 17b are where the first circular geometrical shape 12a and the second circular geometrical shape 12b intersect.

The intersection points 17a, 17b are used to reduce the size of the mobile device region 15, where, as for FIG. 2, must contain the mobile device 2.

Looking at the second intersection point 17b, the entire overlap between the circular geometrical objects is below the second intersection point 17b. Hence, the mobile device 2 must be located below the second intersection point 17b. This knowledge is used to reduce the mobile device region 15 by reducing the height of the mobile device region 15 to the second intersection point 17b.

By reducing the size of the mobile device region 15, the accuracy is improved, since there is a smaller mobile device region 15 in which the mobile device 2 is known to be located. Nevertheless, the certainty that the mobile device is in the mobile device region 15 is not compromised with this procedure.

Figure 4:
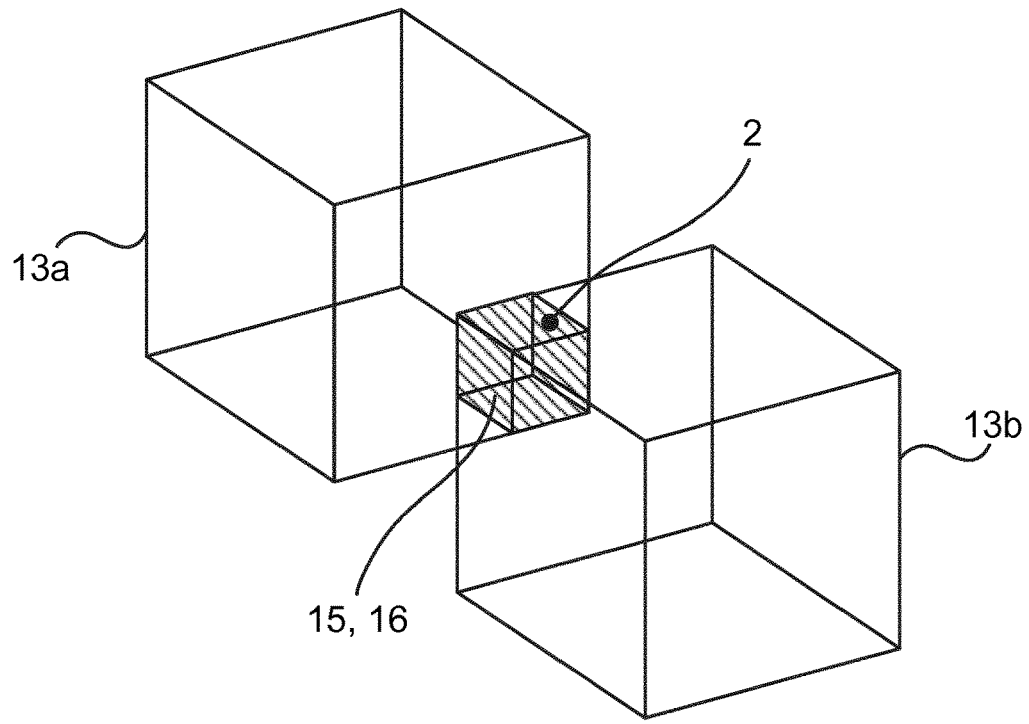
FIG. 4 is a schematic diagram illustrating determination of a mobile device region with great certainty in three dimensions according to one embodiment.

FIG. 4 is a schematic diagram illustrating determination of a mobile device region with great certainty in three dimensions according to one embodiment. In other words, the embodiments presented and described above can be expanded to three dimensions.

When applied in three dimensions, the first polytope 13a and the second polytope are cubes or cuboids. The overlapping region 16 between the first polytope 13a and the second polytope 13b is in the shape of a cuboid or a cube. Hence, the mobile device region 15 is also in the shape of a cuboid or a cube.

While not shown in FIG. 4, the first circular geometrical object 12a and the second circular geometrical object 12b are here both in the shape of a sphere.

Figure 5:
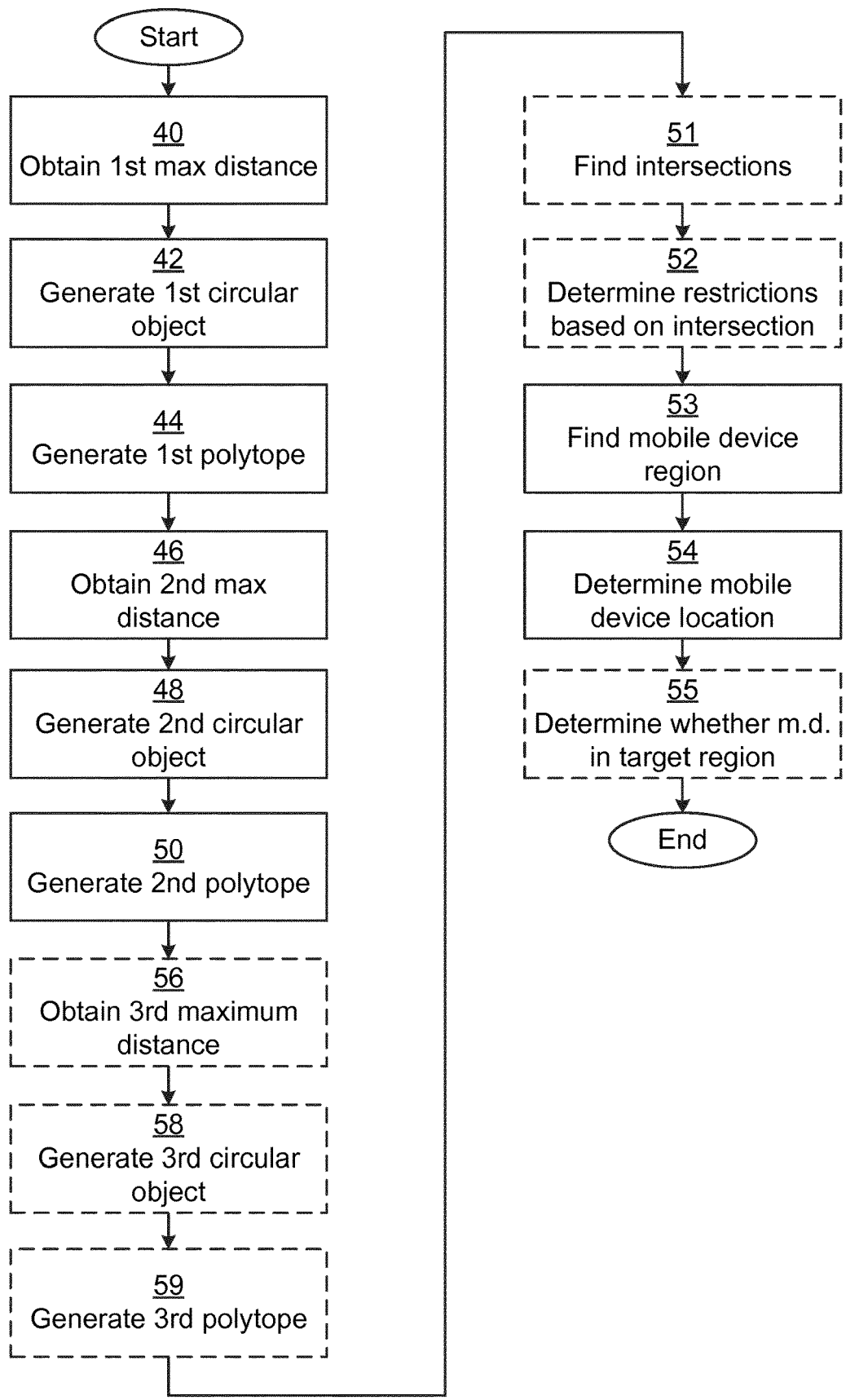
FIG. 5 is a flow chart illustrating a method for determining a location of a mobile device.

FIG. 5 is a flow chart illustrating a method for determining a location of a mobile device. The method is performed in a location determiner.

In an obtain $1^{st}$ max distance step 40, the location determiner obtains a first maximum distance between a first anchor point and the mobile device.

In a generate $1^{st}$ circular object step 42, the location determiner generates a first circular geometrical object. The first circular geometrical object is centred on the first anchor point and has a radius which is based on the first maximum distance. When applied in two dimensions, the first circular geometrical object is a circle and when applied in three dimensions, the first circular geometrical object is a sphere.

In a generate $1^{st}$ polytope step 44, the location determiner generates a first polytope encompassing the first circular geometric object. All angles of the first polytope are right angles. When applied in two dimensions, the polytope is a rectangle or square, and when applied in three dimensions, the polytope is a cuboid or cube.

In one embodiment, each side of the first polytope touches the encompassed first circular geometrical object.

In an obtain $2^{nd}$ max distance step 46, the location determiner obtains a second maximum distance between a second anchor point and the mobile device. It is to be noted that this step is performed close in time to step 40 to prevent miscalculations due to the mobile device moving between obtaining the different distances. For instance, step 40 and 46 can be performed within a threshold time of each other.

In a generate $2^{nd}$ circular object step 48, the location determiner generates a second circular geometrical object. The second circular geometrical object is centred on the second anchor point and has a radius which is based on the second maximum distance. When applied in two dimensions, the second circular geometrical object is a circle and when applied in three dimensions, the second circular geometrical object is a sphere.

In a generate $2^{nd}$ polytope step 50, the location determiner generating a second polytope encompassing the second circular geometric object. All angles of the second polytope are right angles. When applied in two dimensions, the polytope is a rectangle or square, and when applied in three dimensions, the polytope is a cuboid or cube.

In one embodiment, each side of the second polytope touches the encompassed second circular geometrical object.

In one embodiment, at least one side of the first polytope and at least one side of the second polytope are parallel. For instance, the sides of the first polytope and the second polytope can be aligned with axes of a Cartesian coordinate system. This significantly simplifies calculation of overlap.

In an optional obtain $3^{rd}$ max distance step 56, the location determiner obtains a third maximum distance between a third anchor point and the mobile device.

In an optional generate $3^{rd}$ circular object step 58, the location determiner generates a third circular geometrical object. The third circular geometrical object is centred on the third anchor point and has a radius based on the third maximum distance. When applied in two dimensions, the third circular geometrical object is a circle and when applied in three dimensions, the third circular geometrical object is a sphere.

In an optional generate $3^{rd}$ polytope step 59, the location determiner generates a third polytope encompassing the third circular geometric object. All angles of the third polytope are right angles. When applied in two dimensions, the polytope is a rectangle or square, and when applied in three dimensions, the polytope is a cuboid or cube.

It is to be noted that steps 56, 58 and 59 can optionally be repeated respectively for an arbitrary number of anchor points, and thus maximum distances, circular objects and polytopes, i.e. for a fourth anchor point, a fifth anchor point, etc. More anchor points result in a smaller mobile device region, and thus greater accuracy.

In an optional find intersections step 51, the location determiner finds, for the two-dimensional case, intersection points (see 17a-b of FIG. 3) between the first circular geometrical object and the second circular geometrical object. Intersections can have the ability to, but do not need to, contribute to reducing the size of the mobile device region.

Figure 6:
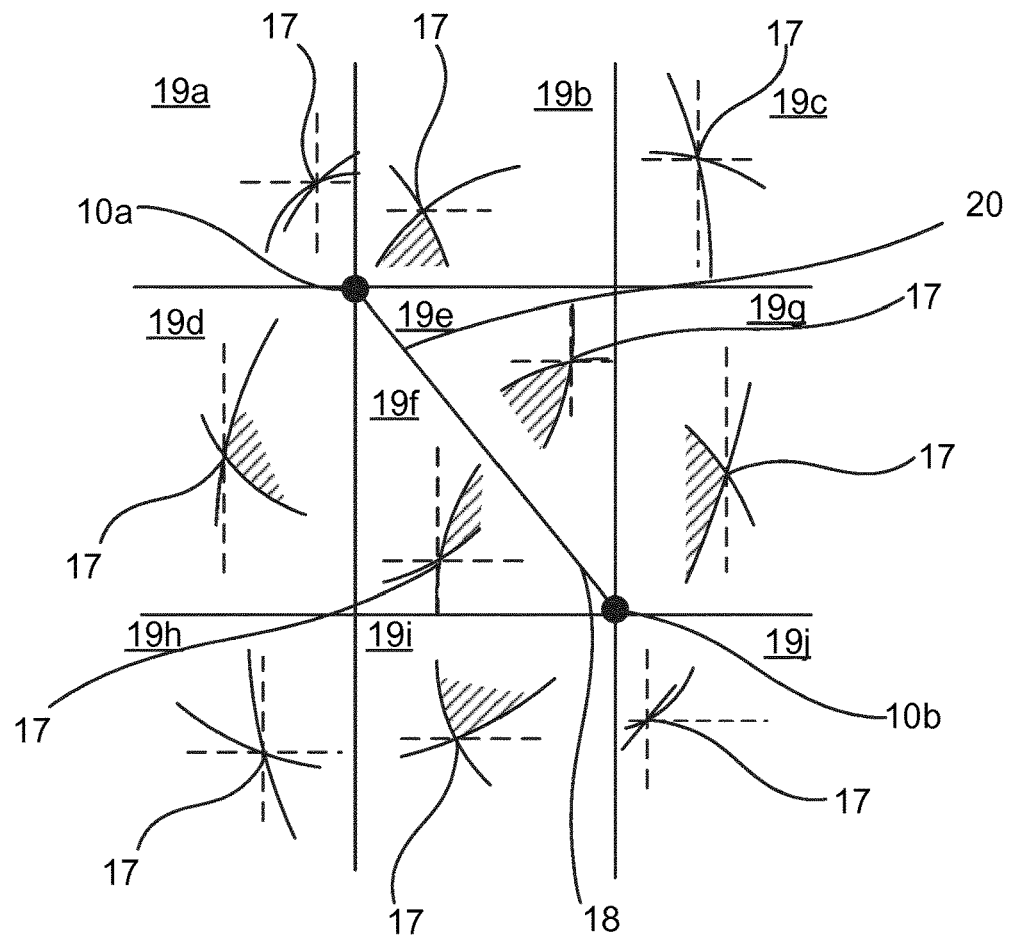
FIG. 6 is a schematic diagram illustrating how intersection points location in relation to anchor points can limit the mobile device region, when the first anchor point is above the second anchor point.
Figure 7:
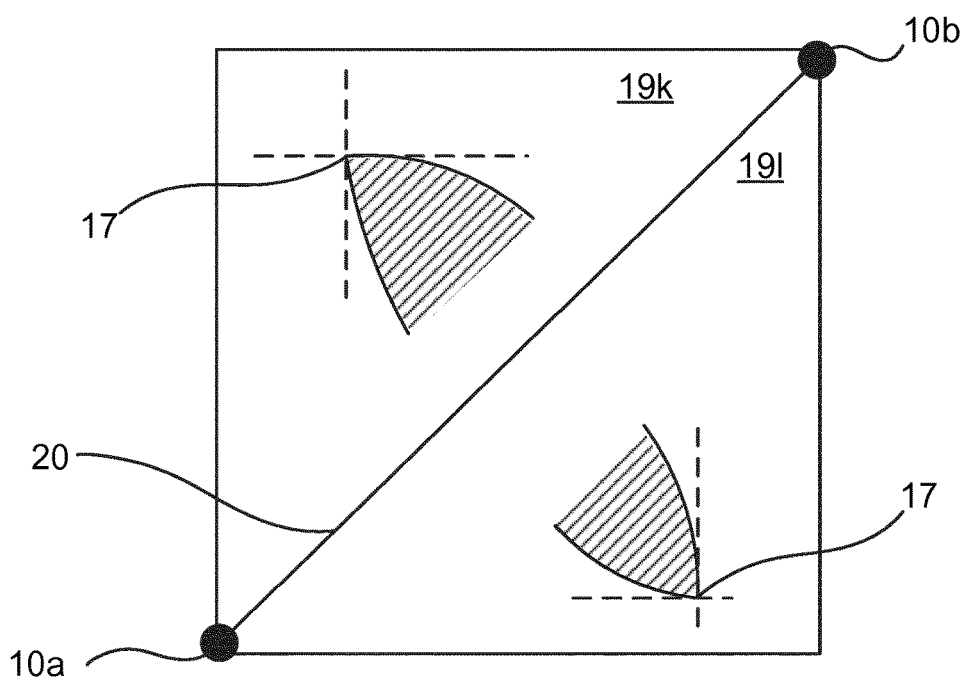
FIG. 7 is a schematic diagram illustrating how intersection points location in relation to anchor points can limit the mobile device region, when the first anchor point is below the second anchor point.

Intersection points 17 are now explained a bit further with reference to FIG. 6, where intersection points 17 are illustrated in relation to the first anchor point boa and the second anchor point bob. Different potential sections 19a-j are shown where intersection points 17 can occur, based mainly on a combination of quadrants of the two anchor points. When applied as explained below, the mobile device region can be reduced by one or two straight lines, reflecting that the mobile device is to the right or left, and/or above or below the intersection point 17.

The relations illustrated in FIG. 6 can be used to determine whether an intersection point 17 can contribute to reducing the size of the mobile device region.

When the intersection point 17 is located in the same quadrants of both the first anchor point and the second anchor point, see the first section 19c, the third section 19c, the eighth section 19h, and the tenth section 19j, the intersection point 17 does not contribute.

In other words, when the intersection point 17 is located in the third section 19c, which is defined by the first quadrant of the first anchor point boa and the first quadrant of the second anchor point 10b, the intersection point 17 does not contribute. When the intersection point 17 is located in the first section 19a, which is defined by the second quadrant of the first anchor point boa and the second quadrant of the second anchor point 10b, the intersection point 17 does not contribute. When the intersection point 17 is located in the eighth section 19h, which is defined by the third quadrant of the first anchor point boa and the third quadrant of the second anchor point 10b, the intersection point 17 does not contribute. When the intersection point 17 is located in the tenth section 19j, which is defined by the fourth quadrant of the first anchor point boa and the fourth quadrant of the second anchor point 10b, the intersection point 17 does not contribute.

When the intersection point 17 is located in the second section 19b, which is defined by the first quadrant of the first anchor point boa and the second quadrant of the second anchor point 10b, the mobile device is below the intersection point 17.

When the intersection point 17 is located in the fourth section 19d, which is defined by the third quadrant of the first anchor point boa and the second quadrant of the second anchor point 10b, the mobile device is to the right of the intersection point 17.

When the intersection point 17 is located in the ninth section 19i, which is defined by the fourth quadrant of the first anchor point boa and the third quadrant of the second anchor point 10b, the mobile device is above the intersection point 17.

When the intersection point 17 is located in the seventh section 19g, which is defined by the fourth quadrant of the first anchor point boa and the first quadrant of the second anchor point 10b, the mobile device is to the left of the intersection point 17.

When the intersection point 17 is located in the fourth quadrant of the first anchor point boa and the second quadrant of the second anchor point 10b, the intersection point can be either in the fifth section 19e or the sixth section 19f. The distinction between the fifth section 19e and the sixth section 19f is based on whether the intersection point 17 is above (for the fifth section 19e) or below (for the sixth section 19f) a straight line 20 between the first anchor point boa and the second anchor point 10b.

When the intersection point 17 is located in the fifth section 19e, the mobile device is both below and to the left of the intersection point 17. When the intersection point 17 is located in the sixth section 19f, of the intersection point.

For the three-dimensional case, the location determiner finds intersecting lines between the first circular geometrical object and the second circular geometrical object.

In an optional determine restriction(s) based on intersections step 52, the location determiner determines which, if any, of the intersection points that can be applied to restrict where the mobile device is located.

In a find mobile device region step 53, the location determiner finds a mobile device region as an overlap between the first polytope and the second polytope.

When there are three polytopes, this step comprises finding the overlap between the first polytope, the second polytope and the third polytope.

When applicable, the step of finding the mobile device region comprises reducing the size of the mobile device region based on the at least one applicable intersection point.

In determine mobile device location step 54, the location determiner determines that the mobile device is located within the mobile device region. In other words, the location is not here a specific point, but a region.

In an optional determine whether m.d. (mobile device) in target region step 55, the location determiner determines that the mobile device is located within a target region when the target region fully encompassed the mobile device region.

Figure 8:
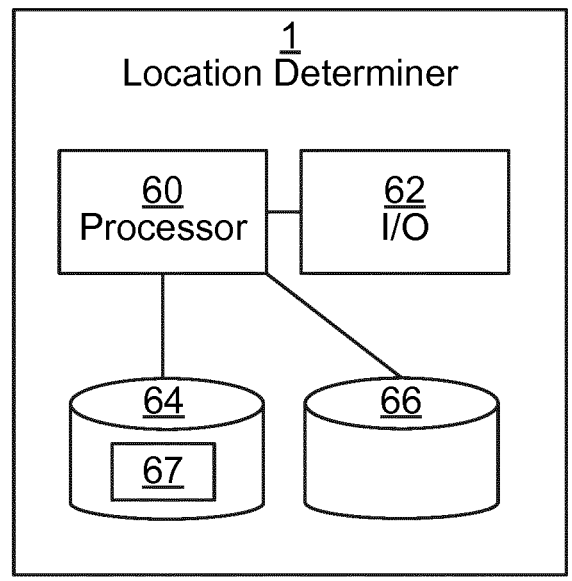
FIG. 8 is a schematic diagram illustrating components of the location determiner of FIG. 1.

FIG. 8 is a schematic diagram illustrating components of the location determiner 1 of FIG. 1. It is to be noted that one or more of the mentioned components can be shared with a host device. The location determiner 1 can be battery powered, whereby resources are very limited in order to preserve battery life. A processor 60 is provided using any combination of one or more of a suitable central processing unit (CPU), multiprocessor, microcontroller, digital signal processor (DSP), etc., capable of executing software instructions 67 stored in a memory 64, which can thus be a computer program product.

The processor 60 could alternatively be implemented using an application specific integrated circuit (ASIC), field programmable gate array (FPGA), etc. The processor 60 can be configured to execute the method described with reference to FIG. 5 above.

The memory 64 can be any combination of random-access memory (RAM) and/or read-only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

The location determiner 1 further comprises an I/O interface 62 for communicating with other external entities. Optionally, the I/O interface 62 also includes a user interface.

Other components of the location determiner 1 are omitted in order not to obscure the concepts presented herein.

Figure 9:
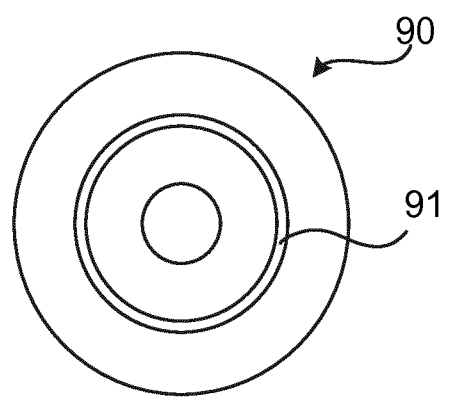
FIG. 9 shows one example of a computer program product 90 comprising computer readable means.

FIG. 9 shows one example of a computer program product 90 comprising computer readable means. On this computer readable means, a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 8. While the computer program 91 is here schematically shown as a track on the depicted optical disk, the computer program can be stored in any way which is suitable for the computer program product, such as a removable solid-state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A method for determining a location of a mobile device, the method being performed in a location determiner and comprising:
   obtaining a first maximum distance between a first anchor point and the mobile device;
   generating a first circular geometrical object, centred on the first anchor point, having a radius based on the first maximum distance;
   generating a first polytope encompassing the first circular geometric object, wherein all angles of the first polytope are right angles;
   obtaining a second maximum distance between a second anchor point and the mobile device;
   generating a second circular geometrical object, centred on the second anchor point, having radius based on the second maximum distance;
   generating a second polytope encompassing the second circular geometric object, wherein all angles of the second polytope are right angles;
   finding a mobile device region as an overlap between the first polytope and the second polytope; and
   determining that the mobile device is located within the mobile device region.

2. The method according to claim 1, wherein at least one side of the first polytope and at least one side of the second polytope are parallel.

3. The method according to claim 2, wherein the sides of the first polytope and the second polytope are aligned with axes of a Cartesian coordinate system.

4. The method according to claim 1, further comprising:
   determining that the mobile device is located within a target region when the target region fully encompassed the mobile device region.

5. The method according to claim 1, wherein each side of the first polytope touches the encompassed first circular geometrical object and each side of the second polytope touches the encompassed second circular geometrical object.

6. The method according to claim 1, wherein the geometrical objects are two dimensional objects, and the method further comprises:
   finding intersection points between the first circular geometrical object and the second circular geometrical object; and
   determining which, if any, of the intersection points that can be applied to restrict where the mobile device is located, and, when applicable, finding the mobile device region comprises reducing the size of the mobile device region based on the at least one applicable intersection point.

7. The method according to claim 1, further comprising:
obtaining a third maximum distance between a third anchor point and the mobile device;
generating a third circular geometrical object, centred on the third anchor point, having a radius based on the third maximum distance; and
generating a third polytope encompassing the third circular geometric object, wherein all angles of the third polytope are right angles;
wherein finding an overlap comprises finding the overlap between the first polytope, the second polytope and the third polytope.

8. A location determiner for determining a location of a mobile device, the location determiner comprising:
a processor; and
a memory storing instructions that, when executed by the processor, cause the location determiner to:
obtain a first maximum distance between a first anchor point and the mobile device;
generate a first circular geometrical object, centred on the first anchor point, having a radius based on the first maximum distance;
generate a first polytope encompassing the first circular geometric object, wherein all angles of the first polytope are right angles;
obtain a second maximum distance between a second anchor point and the mobile device;
generate a second circular geometrical object, centred on the second anchor point, having radius based on the second maximum distance;
generate a second polytope encompassing the second circular geometric object, wherein all angles of the second polytope are right angles;
find a mobile device region as an overlap between the first polytope and the second polytope; and
determine that the mobile device is located within the mobile device region.

9. The location determiner according to claim 8, wherein at least one side of the first polytope and at least one side of the second polytope are parallel.

10. The location determiner according to claim 9, wherein the sides of the first polytope and the second polytope are aligned with axes of a Cartesian coordinate system.

11. The location determiner according to claim 8, further comprising instructions that, when executed by the processor, cause the location determiner to:
determine that the mobile device is located within a target region when the target region fully encompassed the mobile device region.

12. The location determiner according to claim 8, wherein each side of the first polytope touches the encompassed first circular geometrical object and each side of the second polytope touches the encompassed second circular geometrical object.

13. The location determiner according to claim 8, wherein the geometrical objects are two dimensional objects, and the method further comprises instructions that, when executed by the processor, cause the location determiner to:
find intersection points between the first circular geometrical object and the second circular geometrical object; and
determine which, if any, of the intersection points that can be applied to restrict where the mobile device is located, and, when applicable, reduce the size of the mobile device region based on the at least one applicable intersection point.

14. A non-transitory computer-readable medium comprising a computer program stored thereon for determining a location of a mobile device, the computer program comprising computer program code which, when run on a location determiner causes the location determiner to:
obtain a first maximum distance between a first anchor point and the mobile device;
generate a first circular geometrical object, centred on the first anchor point, having a radius based on the first maximum distance;
generate a first polytope encompassing the first circular geometric object, wherein all angles of the first polytope are right angles;
obtain a second maximum distance between a second anchor point and the mobile device;
generate a second circular geometrical object, centred on the second anchor point, having radius based on the second maximum distance;
generate a second polytope encompassing the second circular geometric object, wherein all angles of the second polytope are right angles;
find a mobile device region as an overlap between the first polytope and the second polytope; and
determine that the mobile device is located within the mobile device region.

* * * * *